United States Patent
Murray

[11] Patent Number: 5,925,996
[45] Date of Patent: Jul. 20, 1999

[54] GARAGE DOOR OPERATOR MOTOR SECONDARY THERMAL OVERLOAD

[75] Inventor: James S. Murray, Redford, Mich.

[73] Assignee: Whistler Corporation of Massachusetts, Chelmsford, Mass.

[21] Appl. No.: 08/948,720

[22] Filed: Oct. 10, 1997

[51] Int. Cl.⁶ .................................. H02P 1/44; H02D 5/40
[52] U.S. Cl. .......................... 318/471; 318/774; 318/783; 361/24
[58] Field of Search .................... 318/430–480; 361/20–33

[56] References Cited

U.S. PATENT DOCUMENTS

| | | | |
|---|---|---|---|
| 3,569,781 | 3/1971 | Strachan | 317/13 |
| 3,764,874 | 10/1973 | Geoffrey | 318/266 |
| 3,803,866 | 4/1974 | Barry | 62/158 |
| 3,813,590 | 5/1974 | Ellmore | 318/266 |
| 3,903,456 | 9/1975 | Schaefer | 317/13 B |
| 4,037,316 | 7/1977 | Stoll | 29/622 |
| 4,084,202 | 4/1978 | Stoll | 361/24 |
| 4,086,558 | 4/1978 | Pejouhy et al. | 337/102 |
| 4,092,573 | 5/1978 | D'Entremont | 318/221 C |
| 4,100,468 | 7/1978 | Slocum | 318/221 C |
| 4,119,896 | 10/1978 | Estes, III et al. | 318/266 |
| 4,121,140 | 10/1978 | Jones | 318/221 R |
| 4,161,681 | 7/1979 | Rathje | 318/783 |
| 4,341,987 | 7/1982 | Fisher | 318/774 |
| 4,344,252 | 8/1982 | Suzuki et al. | |
| 4,353,022 | 10/1982 | Young | 318/753 |
| 4,357,564 | 11/1982 | Deming et al. | 318/280 |
| 4,384,312 | 5/1983 | Fry | 361/24 |
| 4,386,398 | 5/1983 | Matsuoka et al. | |
| 4,393,342 | 7/1983 | Matsuoka et al. | |
| 4,641,067 | 2/1987 | Iizawa | 318/287 |
| 4,792,877 | 12/1988 | Thornton | |
| 4,819,118 | 4/1989 | Mueller et al. | 361/25 |
| 4,831,509 | 5/1989 | Jones et al. | |
| 5,166,586 | 11/1992 | Yaguchi | 318/434 |
| 5,220,478 | 6/1993 | Innes et al. | 361/93 |
| 5,278,480 | 1/1994 | Murray | |
| 5,345,126 | 9/1994 | Bunch | 310/68 C |
| 5,729,416 | 3/1998 | Renkes et al. | 361/23 |

*Primary Examiner*—Paul Ip
*Attorney, Agent, or Firm*—Young & Basile, PC

[57] ABSTRACT

A secondary thermal overload device is connected to one winding of a motor having a bi-directional rotatable output shaft and is preset at a lower trip temperature than a trip temperature of a primary thermal overload device connected to the motor to deactivate only the one motor winding effecting closing movement of a garage door at a lower motor operating temperature and before the primary thermal overload device trips while enabling the motor winding associated with an opening movement of the garage door to be activated to open the garage door.

10 Claims, 2 Drawing Sheets

GARAGE DOOR OPERATOR MOTOR SECONDARY THERMAL OVERLOAD

BACKGROUND OF THE INVENTION

1. Field of the Invention

The present invention relates, in general, to garage door operators and, more specifically, to motor controls for garage door operators.

2. Description of the Art

Garage door operators or openers responsive to manually controlled switches directly wired to the controller or switches coupled by radio signals to the controller are well known. The controller normally opens the door from a closed or partially closed position when the switch is actuated and closes the door if it is open when the switch is actuated.

It is also known to provide garage door operators or openers with upper and lower position limits, and with sensitivity or torque limits. Generally, manual adjustment or selection is provided to allow the user or the installer of the door operator to set position limits which coincide with the fully opened and fully closed positions of the door, and to set sensitivity limits which permit sufficient torque throughout the complete range of door movement in both opening and closing directions, but with not enough torque to damage the door. The sensitivity setting and the position limits are also used in obstruction detection to stop the door in time to prevent substantial damage to the obstruction. The forms of obstruction detection are many and include mechanical sensors in the lower portion of the door, motor load monitoring devices, and run time circuits.

It is also known to employ microprocessors in the controller to determine limits, activation code signals, obstruction detection, door position, etc. FIG. 1 shows a prior art use of a thermal overload in a motor control circuit of a garage door operator. The thermal overload switch is connected to the neutral power line and the motor windings. The thermal overload switch is set for a predetermined overload temperature, such as 130° C., for example. If an overload occurs due to a stalled door, for example, the temperature of the motor windings increases causing the thermal overload switch to open and cut current to the motor to thereby deactivate the motor and the control circuit.

However, when the thermal overload switch is actuated, the disconnection of electrical power stops door movement in the last position of the door, such as fully closed, fully opened or varying degrees of partially opened or closed. Depending on the overload temperature, it may take from 1 to 15 minutes for the thermal overload switch to automatically reset to a closed state reapplying power to the motor windings.

Dual thermal overload switches have been employed in motor circuits, specifically in separate power lines, but not with garage door operator motors which still enable partial door operation after activation of any one thermal overload switch.

Thus, it is desirable to provide a garage door operator motor control circuit having dual thermal overload means which enables partial door and motor operation in the event of a thermal overload event. It would also be desirable to provide a garage door operator with a secondary thermal overload means for garage door opening movement to a fully opened position prior to activation of the main or primary thermal overload means.

SUMMARY OF THE INVENTION

A secondary thermal overload device or sensor means which is connected to a motor winding of a motor having a bi-directional output shaft coupled by an operator to a garage door, for deactivating electric power to the winding associated with a closing garage door movement upon sensing a motor temperature overload at a lower temperature than the preset trip temperature of a primary temperature overload device connected to both motor windings.

The present control apparatus is coupled to a garage door operator controlling movement of a garage door between opened and closed position. The control apparatus comprises an electric motor having first and second windings for rotating an output shaft of the motor in two opposed directions when electric power is applied thereto. Operator means are coupled between a garage door and an output shaft of the motor for translating bi-directional rotation of the output shaft of the motor to movement of a garage door in opening and closing directions. Open and close switch means are serially connected to the first and second windings, respectively, for completing an electric circuit to the first and second windings. Control means selectively activate the open and close switch means. A primary thermal overload sensor means is connected between both of the first and second windings and a source of electric power for disconnecting power to both of the first and second windings at a primary overload temperature of the motor. A secondary thermal overload sensor means is connected between the second winding and the close switch means for disconnecting electric power to the second winding when the motor operating temperature reaches a second preset overload temperature.

The preset trip temperature of the secondary thermal overload sensor means is lower than the trip temperature of the primary thermal overload sensor means to deactivate the second winding of the motor associated with a closing movement of the garage door upon sensing an overload temperature earlier and at a lower temperature than the preset overload temperature of the primary thermal overload sensor means to enable the first winding of the motor to be activated, if necessary, to move the door to the full open position before the motor temperature reaches the preset temperature of the primary overload sensor means.

The present invention also includes a method of controlling the position of a closure between opposed open and closed positions in an opening. The method includes comprising the steps of:

A) providing an electric motor having first and second windings for rotating an output shaft of the motor in one of two opposed directions when electric power is applied to one of the first and second windings;

B) coupling an operator to the closure and the output shaft of the motor for translating bi-directional rotation of the output shaft of the motor to translation of the closure between open and closed positions;

C) selectively applying electric power to one of the first and second windings to move the closure between the open and closed positions, respectively;

D) disconnecting electric power to both of the first and second windings upon detecting a primary overload operating temperature of the motor;

E) disconnecting electric power to one of the first and second windings of the motor effecting movement of the closure to the closed position upon detecting a secondary thermal overload operating temperature of the motor less than the primary overload operating temperature; and F) enabling the application of electric power to the other of the first and second windings to effect movement of the closure to the open position.

The secondary thermal overload sensor means the present invention provides a unique function in garage door operator motor control circuits. As the primary thermal overload device normally employed in garage door operator motors deactivates both windings of the motor when the primal overload temperature is detected, the provision of the secondary thermal overload sensor means, which is preset at a lower temperature than the trip temperature of the primary thermal overload sensor means, enables the closing winding of the motor to be deactivated while still enabling the garage door to be moved to the open position. This prevents the garage door from being held in the closed position without the motor being able to move the garage door to the open position, which situation will exist until the primary thermal overload device automatically resets in 1 to 15 minutes. Applicant's invention uniquely eliminates this problem since the secondary thermal overload sensor means of the present invention deactivates only the second or closing winding of the motor while enabling the first or opening winding of the motor to remain active such that the motor controller can cause the garage door operator motor to move the garage door to the open position before the temperature of the motor reaches the trip temperature of the primary thermal overload sensor means.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 1:
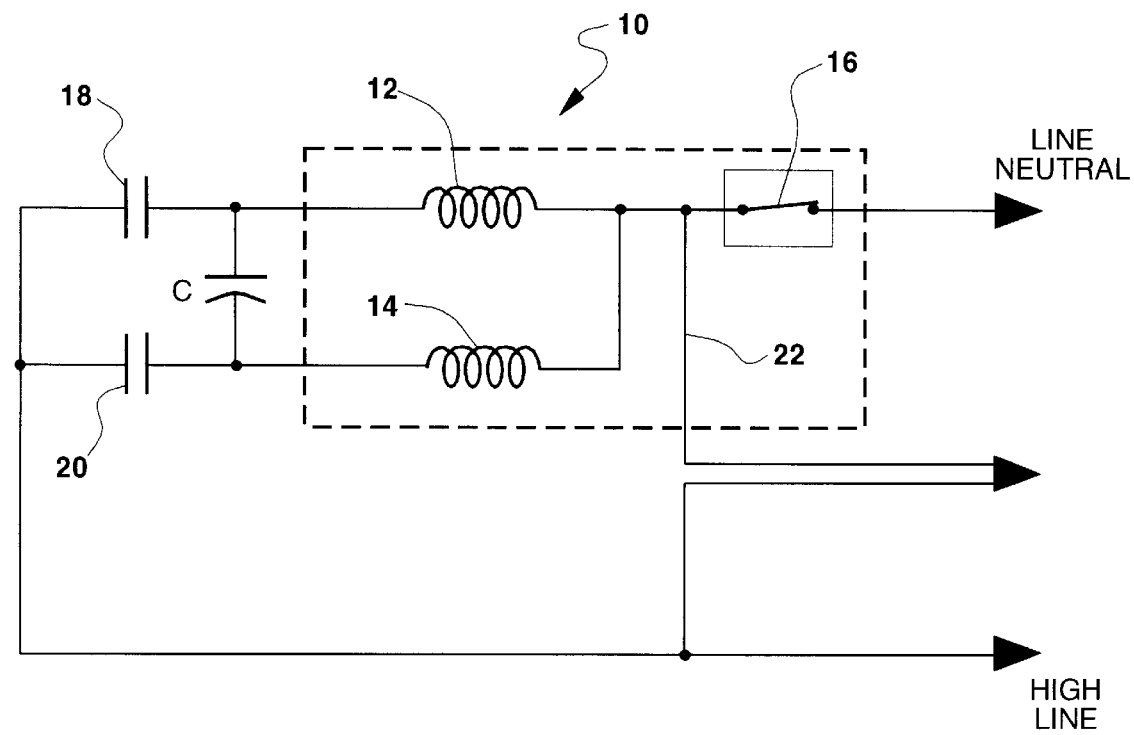
FIG. 1 is a schematic diagram of a prior art garage door operator motor control circuit.

FIG. 1 depicts a simplified circuit of a prior art garage door operator motor for bi-directionally controlling the direction of rotation of the output shaft of the motor to thereby control movement of the garage door between full open and full closed positions. Other conventional inputs and switches associated with a conventional garage door operator, such as obstruction switches, manual pushbutton inputs, remote radio frequency receivers and transmitters and pull-up and pull-down limit switches are not shown in FIG. 1 for clarity. Such features are depicted in greater detail in FIG. 2 and described hereafter.

In FIG. 1, a motor 10 includes two windings 12 and 14 which are connected in parallel through a single thermal overload device or temperature sensor 16 to the neutral line of an electrical power distribution network. The other line of the electrical power distribution network is connected through a switch means formed of a pair of parallel switches or contacts depicted as an open switch 18 and a close switch 20. The open switch or contact 18 is connected in series with the motor winding 12 and the close switch or contact 20 is connected in series with the second motor winding 14. A motor start capacitor C is connected across the motor winding 12 and 14.

Figure 2:
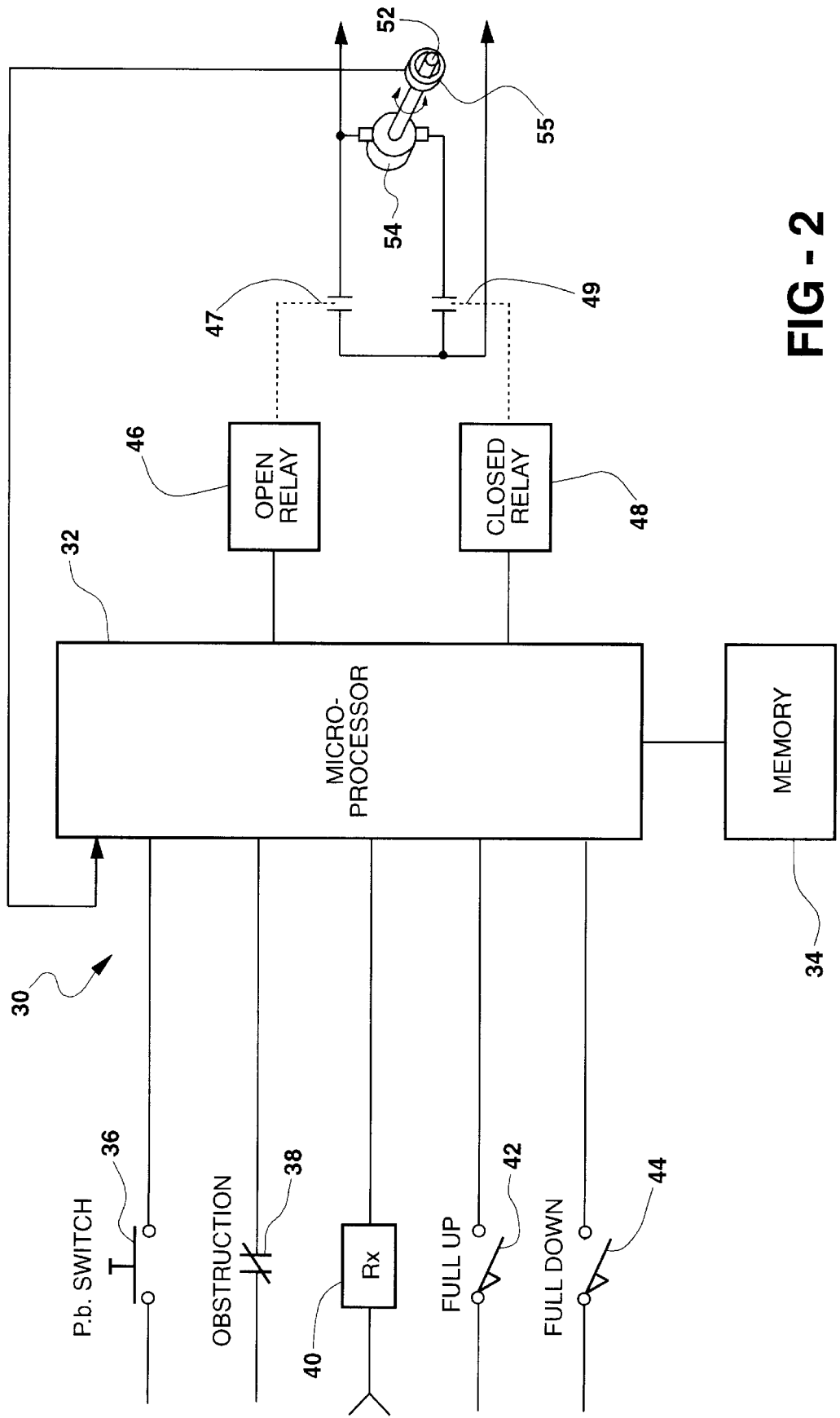
FIG. 2 is a block, schematic diagram of a typical garage door operator control circuit using the motor control circuit of the present invention.

In operation, a garage door operator controller, shown FIG. 2, in response to selected inputs, will activate and close one of the contacts or switches 18 and 20 thereby supplying electrical power to one winding 12 or 14 and through the capacitor C to the other motor winding 12 and 14. This causes the output shaft of the motor 10 to rotate in the selected direction to thereby move the garage door operator connected to the motor output shaft in the direction selected by the controller via the open and close switches 18 and 20.

The temperature sensor means, such as a conventional thermal overload device 16, is usually part of the motor circuit and is connected between the parallel windings 12 and 14 and the neutral electric power line. The thermal overload device 16 is usually factory set at a predetermined temperature, such as 130° C. During an overload event, such as that caused by a stalled motor resulting from the garage door hitting a obstruction, the thermal overload device 16 will open thereby breaking the circuit through the motor windings 12 and 14 and deactivate the motor 10. While the thermal overload device 16 protects the motor 10 from overheating due to excessive current, tripping of the thermal overload device 16 could cause a problem depending upon the position of the garage door when the thermal overload device 16 opens. For example, if the thermal overload device 16 opens as a result of a thermal overload event, the garage door could remain in the closed position. The garage door will remain in the closed position until the thermal overload device 16 automatically resets which could take from 1 to 15 minutes, for example, or until the temperature drops below the preset overload temperature of 130° C.

If the door is closed when the primary thermal overload device 16 trips open, since the sensor 16 also disconnects power to the operator or controller, the controller cannot open the garage door. As shown in FIG. 1, a conductor 22 connected to the motor controller is also connected to the neutral power line conductor through the thermal overload device 16. Opening of the thermal overload device 16 disconnects power on the conductor 22 thereby preventing the garage door from being controlled by the motor until the thermal overload device 16 automatically resets itself.

To overcome this problem, Applicant has uniquely incorporated a secondary temperature sensor or thermal overload device in the motor circuit which trips at a lower temperature than the primary thermal overload device 16 to prevent rotation of the output shaft of the motor and thereby travel of the garage door only in a closing direction. When a high temperature, less than the temperature trip point of the primary thermal overload device is detected, the secondary thermal overload, which is connected only in the close winding circuit of the motor, prevents rotation of the motor 10 output shaft in a direction causing downward or closing travel of the as described hereafter.

FIG. 2 depicts a general block diagram of a garage door operator for bi-directionally controlling movement of the garage door. A controller 30 is typically in the form of microprocessor 32 executing a controlled program stored in a memory 34. The microprocessor 32 is responsive to a variety of inputs including a manual open or close pushbutton 36, an obstruction contact 38 which may be a photobeam along the lower edge of the garage opening and/or a switch mounted in the bottom of the garage door itself, the output of a radio frequency receiver 40 which is responsive to coded input signals from a remote transmitter, a full open or up garage door position limit switch detector 42, and a full down or closed garage door position limit switch 44.

In response to the various inputs and under the control of the control program stored in the memory 34, the microprocessor 32 activates either an open relay 46 or a close relay 48. The relays 46 and 48 each have a switchable contact 47 and 49, respectively, as shown in FIG. 3, to control electrical current flow to one of the motor windings, also shown in detail in FIG. 3, and thereby the direction of rotation of an output shaft 52 of a motor 54.

Figure 3:
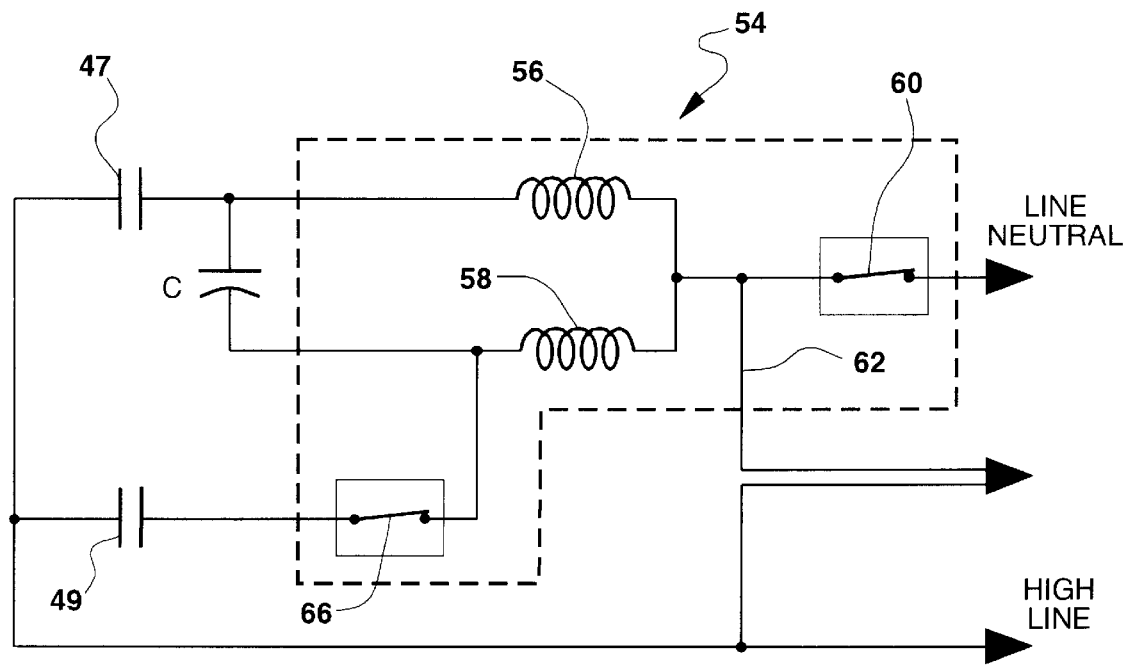
FIG. 3 is a schematic diagram of a garage door operator motor control circuit constructed according to the present invention.

As shown in FIG. 3, the motor 54 includes parallel connected first and second windings 56 and 58, respectively. The first winding 56 is associated with a garage door open movement and the second winding 58 is associated with or causes a garage door closing movement. The windings 56 and 58 are connected in parallel through a first or a primary temperature sensor or thermal overload sensor means 60 to the neutral line of an electric power distribution network. The conductor 62 connects the neutral line to the microprocessor 32. A motor start capacitor C is connected across one end of the motor windings 56 and 58 as shown in FIG. 3.

The high potential line of the power distribution network is connected to the contacts 50 and 52. The contact 47 is connected in series with the first winding 56 and, when closed, completes a circuit between the high potential power line, the first winding 56 and the neutral line to cause the output shaft 52 of the motor 54 to rotate in a direction causing opening of the garage door.

The second contact 49 is connected in series with a secondary thermal overload sensor means 66, such as thermal overload device 66, and the second winding 58 of the motor 54. With the secondary thermal overload sensor means 66 in a closed position, activation of the close relay 48 causes the second contact 49 to close thereby completing an electric power circuit through the second winding 58 to the neutral line of the power distribution network which causes the output shaft 52 of the motor 54 to rotate in a opposite direction from that described above to drive the garage door in a closing direction.

The motor start capacitor C connected between the windings 56 and 58 causes the current flow through one of the winding 56 and 58 from the contacts 47 or 49 to be delayed or made out of phase from the current flowing through the other winding 56 and 58. This creates a torque in the motor 54 which rotates the output shaft 52 in the desired direction as selected by the contacts 47 or 49.

The secondary thermal overload sensor means 66 has a preset trip point temperature less than the trip point temperature of the primary thermal overload sensor means 60. For example, the trip temperature of the primary thermal overload sensor means 60 can be 130° C. By example only, the trip temperature of the secondary thermal overload sensor means 66 is set at 100° C. The preset temperature can be adjustably set or set by the manufacturer. In this manner, the secondary thermal overload sensor means 66 will trip and open at a lower temperature than would cause tripping or opening of the primary thermal overload sensor means 60. The secondary thermal overload sensor means 66 is capable of detecting a temperature rise in the motor which may eventually cause a primary temperature overload, but provides a signal prior to the motor temperature reaching the primary trip temperature of the primary thermal overload sensor means 60. This provides a short time period to take corrective action.

According to the present invention, once the preset temperature of the secondary thermal overload sensor means 66 is reached, the thermal overload sensor means 66 will trip and open thereby disconnecting electric power to the winding 58 associated with the movement of the garage door in a closing direction. However, a circuit still exists through the open contact 47 and the first winding 56 of the motor 54. This enables the microprocessor 32 to open the garage door via software control before the temperature of the motor 54 reaches the trip temperature of the primary thermal overload sensor means 60 which, as described above, completely opens the circuit to the motor 54 and prevents any further operation of the motor 54 and movement of the garage door in either open or closed directions.

A rotation sensor, such as a Hall effect sensor or transducer 55 is mounted about the output shaft 52 of the motor 54 and generates a series of output pulses which are input to the microprocessor 32 and used by the microprocessor 32 to determine the speed of rotation of the output shaft 52 of the motor 54. When the microprocessor 32 detects a decrease in the rotation speed of the output shaft 52, such as that caused by the door hitting an obstruction, the microprocessor 32 automatically activates the open relay 46 to drive the door to the open position.

The microprocessor 32 uses the same obstruction program to automatically activate the open relay and move the garage door to the open position when tripping of the secondary thermal overload sensor 66 causes a decrease in the speed of rotation of the motor output shaft 52.

In summary, there has been disclosed a unique secondary temperature overload sensor means connected in a closing winding circuit of the bi-directional rotatable motor coupled to a garage door opener operator which deactivates the garage door closing winding of the motor at a lower overload temperature than the overload temperature preset in the primary temperature overload device to prevent movement of the garage door in a closing direction; while still enabling the garage door to be moved to the open position. The secondary temperature overload sensor means is easily added to existing garage door operator motor control circuits.

What is claimed is:

1. A control apparatus for a garage door operator controlling movement of a garage door between open and closed position, the control apparatus comprising:

an electric motor having first and second windings for rotating an output shaft of the motor in one of two opposed directions, respectively, when electric power is applied thereto;

a operator means coupled between a garage door and the output shaft of the motor for translating bi-directional rotation of the output shaft of the motor to movement of a garage door in opening and closing directions;

means, connected to the first and second windings, respectively, for mutually exclusively completing an electric circuit to the first and second windings;

primary thermal overload sensor means, connected to both of the first and second windings and a source of electric power, for disconnecting electric power to both of the first and second windings at a sensed primary overload operating temperature of the motor; and secondary thermal overload sensor means, connected to the second winding, for disconnecting electric power to the second winding independently of the primary thermal overload sensor means, when the sensed motor operating temperature reaches a second preset overload temperature, and enabling electric power to still be applied to the first winding to effect movement of the closure in the opening direction.

2. The control apparatus of claim 1 wherein:

the second preset overload temperature of the secondary thermal overload sensor means is lower than the primary overload temperature of the primary thermal overload sensor means.

3. A control apparatus for an operator coupled to a closure movable between open and closed positions by an electric motor having first and second windings for rotating a motor output shaft coupled to the operator in two opposed directions when electric power is applied thereto, the control apparatus comprising:

means, connected to the first and second windings and to a source of electric power, for supplying electric power to the first and second windings;

control means for selectively activating the connecting means;

primary thermal overload sensor means, connected to the first and second windings and a source of electric power, for disconnecting electric power to both of the first and second windings at a sensed primary overload operating temperature of the motor; and secondary thermal overload sensor means, connected to the second winding, for disconnecting electric power to the second winding independently from the primary thermal overload sensor means, while allowing the first winding to be connected to a source of electric power by the connecting means, when an operating temperature of the motor reaches a secondary overload temperature less than the primary overload temperature.

4. A method controlling the position of a closure between opposed open and closed positions in an opening, the method comprising the steps of:

providing an electric motor having first and second windings for rotating a motor output shaft in one of two opposed directions to move the closure between the open and closed positions when electric power is applied to the first and second windings;

coupling an operator to the closure and the motor output shaft for translating bi-directional rotation of the motor output shaft to translation of the closure between the open and closed positions;

applying electric power to the first and second windings to move the closure between the open and closed positions, respectively;

disconnecting electric power to both of the first and second windings upon detecting a primary overload operating temperature of the motor;

disconnecting electric power to only the one of the first and second windings of the motor effecting movement of the closure to the closed position upon detecting a secondary overload operating temperature of the motor less than the primary overload operating temperature; and when the secondary overload operating temperature is detected, enabling the application of electric power to only the other of the first and second windings to effect movement of the closure to the open position.

5. A closure operator control apparatus comprising:

an electric motor having first and second windings, wherein the first and second windings are separately energizable to rotate an output shaft of the first and second opposed directions;

operator means, coupled between a closure and an output shaft of the motor, for translating bi-directional rotation of the output shaft of the motor to movement of the closure in a first opening direction in response to energization of the first winding and in a second, opposed, closing direction in response to energization of the second winding;

means for energizing one of the first and second windings, and thermal overload means, connected in series with only the second winding, for disconnecting electric power to only the second winding at a sensed overload operating temperature of the motor.

6. The apparatus of claim 5 further comprising;

primary thermal overload means, connected to both of the first and second windings and a source of electric power, for disconnecting electric power to both of the first and second winding at a primary overload operating temperature of the motor.

7. The apparatus of claim 6 wherein:

the preset overload temperature of the thermal overload means is lower than the overload temperature of the primary thermal overload means.

8. A control apparatus for a closure operator controlling movement of a closure between open and closed positions, the control apparatus comprising:

an electric motor having first and second windings for rotating an output shaft of the motor in a first direction to open a closure and in a second direction to close the closure when electric power is selectively applied to the first and second windings;

open closure and close closure means connected to the first and second windings, respectively, for completing an electric circuit to the first and second windings;

thermal overload sensor means, connected to the second winding, for disconnecting electric power to only the second winding when the sensed motor operating temperature reaches a secondary preset overload temperature; and circuit means operable to energize the first winding to effect movement of the closure in the opening direction after the secondary preset overload temperature is reached.

9. The control apparatus of claim 8 further comprising:

primary thermal overload sensor means, connected to at least the first winding, for disconnecting electric power to at least the first winding when the sensed motor operating temperature reaches a primary preset overload temperature, the primary preset overload temperature being higher than the secondary preset overload temperature.

10. A closure operator control apparatus comprising:

an electric motor having first and second windings for rotating a motor output shaft coupled to a closure movable in opening and closing directions, the first and second windings being separately energizable to rotate the motor output shaft in first and second opposed directions, respectively;

means for energizing only one of the first and second windings; and thermal overload means, connected in series with the only one of the first and second windings, for disconnecting electric power to the only one of the first and second windings when a sensed motor operating temperature reaches a preset overload temperature, and allowing the other one of the first and second windings to be energized for movement of the closure only in the opening direction.

* * * * *